US007073762B2

(12) United States Patent
Pearson

(10) Patent No.: US 7,073,762 B2
(45) Date of Patent: Jul. 11, 2006

(54) DETACHABLE COMPUTER MOUSE PAD SURFACE IN MULTIPLE SHEET FORM

(76) Inventor: Leonard B. Pearson, 11 Glenbourne Dr., Boonton Township, Morris County, NJ (US) 07005

( * ) Notice: Subject to any disclaimer, the term of this patent is extended or adjusted under 35 U.S.C. 154(b) by 0 days.

(21) Appl. No.: 10/287,048

(22) Filed: Nov. 5, 2002

(65) Prior Publication Data

US 2003/0066940 A1    Apr. 10, 2003

Related U.S. Application Data

(63) Continuation-in-part of application No. 09/838,506, filed on Apr. 19, 2001, now abandoned.

(60) Provisional application No. 60/210,787, filed on Jun. 12, 2000.

(51) Int. Cl.
*A47B 91/00*    (2006.01)

(52) U.S. Cl. .............................. 248/346.01; 248/118.1; 400/715; 428/40.1; 428/42.1; 428/201

(58) Field of Classification Search ........... 248/346.01, 248/118.1; 428/40.1, 42.1, 201; 400/715
See application file for complete search history.

(56) References Cited

U.S. PATENT DOCUMENTS

| 3,673,135 | A | * | 6/1972 | Blake et al. ................. 527/314 |
| 3,925,584 | A | * | 12/1975 | Suzuki et al. ............... 428/40.5 |
| 4,350,545 | A | * | 9/1982 | Garabedian ................... 156/87 |
| 4,678,206 | A | * | 7/1987 | Leahan ......................... 281/44 |
| 4,834,502 | A | | 5/1989 | Bristol et al. ................ 350/322 |
| 4,907,824 | A | | 3/1990 | Smirnoff ....................... 281/45 |
| 4,975,735 | A | * | 12/1990 | Bright et al. ................... 355/75 |
| 5,032,424 | A | * | 7/1991 | Carlson et al. ............. 427/542 |
| 5,084,095 | A | | 1/1992 | Fritz .............................. 106/2 |
| 5,194,299 | A | * | 3/1993 | Fry ........................... 427/208.6 |
| 5,217,781 | A | * | 6/1993 | Kuipers ........................ 428/85 |
| 5,358,766 | A | | 10/1994 | Field ............................. 428/77 |
| 5,405,168 | A | | 4/1995 | Holt ............................... 281/2 |
| 5,464,681 | A | * | 11/1995 | Luce ........................ 428/195.1 |
| 5,542,637 | A | | 8/1996 | Schriner ................ 248/346.01 |
| 5,738,325 | A | | 4/1998 | Brown .................. 248/346.01 |
| 5,788,203 | A | | 8/1998 | Nitti ....................... 248/346.01 |
| 5,820,968 | A | * | 10/1998 | Kurani ........................ 428/137 |

(Continued)

FOREIGN PATENT DOCUMENTS

CA    2191171    5/1997    ............... 11/18

(Continued)

*Primary Examiner*—Robert P. Olszewski
*Assistant Examiner*—Todd M. Epps
(74) *Attorney, Agent, or Firm*—Ernest D. Buff & Associates, LLC; Ernest D. Buff; Theodore J. Pierson

(57) ABSTRACT

A computer mouse pad comprises a rigid base and a plurality of paper sheets arranged in a stack and detachably fixed to the base. Each of the stacked sheet is detachably fixed to a sheet immediately below it in the stack. The sheets are provided with printed messages on upper surfaces thereof. A coating is applied to the upper surfaces of the sheets. The coated upper surfaces are resistant to being written upon, thereby preventing accumulation of carbon, graphite and ink markings, which tend to contaminate the roller ball, prevent proper mouse tracking and adversely affect curser control. When worn, the uppermost sheet is removed, thereby exposing the next sheet in the stack and its message, for use as the upper surface of the mouse pad. Timely refreshment of the upper surface is encouraged by provision of a mouse pad in which the information conveyed by successive sheet removal creates a serial effect.

8 Claims, 3 Drawing Sheets

U.S. PATENT DOCUMENTS

| | | | | |
|---|---|---|---|---|
| 5,876,010 | A | 3/1999 | Murphy | 248/346.01 |
| 5,898,018 | A * | 4/1999 | Hirano et al. | 503/227 |
| 5,919,562 | A | 7/1999 | Root | 428/343 |
| 5,952,070 | A | 9/1999 | Depiero | 428/40.01 |
| 5,971,340 | A | 10/1999 | Murphy | 248/346.01 |
| 6,042,675 | A | 3/2000 | Kim | 156/230 |
| 6,070,845 | A | 6/2000 | Herskovitz | 248/346.01 |
| 6,383,607 | B1 * | 5/2002 | Shin | 428/172 |
| 6,500,293 | B1 * | 12/2002 | Dexter | 156/264 |

FOREIGN PATENT DOCUMENTS

| | | | | |
|---|---|---|---|---|
| CA | 2202007 | 10/1998 | | 11/18 |
| CA | 2249676 | 4/1999 | | 11/18 |
| CA | 2251168 | 4/1999 | | |
| CA | 2267277 | 11/1999 | | 3/33 |
| DE | 39 19 519 A1 * | 12/1990 | | |
| DE | 297 15 302 U | 11/1997 | | |
| DE | 298 23 762 U1 * | 10/1999 | | |
| EP | 0 860 297 A1 | 8/1998 | | |
| EP | 0 930 161 A1 | 7/1999 | | |
| FR | 2572028 A1 * | 4/1986 | | 211/50 |
| FR | 2685112 A1 * | 6/1993 | | |
| FR | 2768248 A1 * | 3/1999 | | |
| GB | 2289520 A * | 11/1995 | | |
| GB | 2307445 A * | 5/1997 | | |
| GB | 2307445 A * | 5/1997 | | |
| JP | 10-260778 A * | 9/1998 | | |
| JP | 2000099265 A * | 4/2000 | | |
| JP | 2000099265 A * | 4/2000 | | |
| WO | WO-98/48375 A1 * | 10/1998 | | |

* cited by examiner

DETACHABLE COMPUTER MOUSE PAD SURFACE IN MULTIPLE SHEET FORM

CROSS REFERENCE TO RELATED APPLICATIONS

This application is a continuation-in-part of U.S. application Ser. No. 09/838,506 filed Apr. 19, 2001 now abandoned which, in turn, claims the benefit of provisional patent application Ser. No. 60/210,787, filed Jun. 12, 2000.

BACKGROUND OF THE INVENTION

1. Field of the Invention

The present invention relates to the field of computer mouse pads; and more particularly, to a multi-function, computer mouse pad having detachable surfaces in multiple sheet form.

2. Description of the Prior Art

The computer mouse pad has become a standard peripheral for the personal computer. It typically functions in combination with the computer mouse to facilitate and improve the accuracy and efficiency of mouse manipulation. Mouse pads also prevent desks and tabletops on which the computer resides from being scratched by the mouse.

One of the problems with conventional mouse pads is the tendency thereof to collect scratches, stains, dirt and other disfigurements during use. Such blemishes and disfigurements not only mar the appearance of the mouse pad, but interfere with its tracking ability. Lint and other objects picked up by the rollers of the mechanical mouse accumulates on rollers housed inside the mouse. Inasmuch as these rollers support the track ball, the accumulation of lint thereon adversely affects roller-track ball contact. Tracking motion, and curser control, as well as free motion of the mouse are impaired. The mouse's tracking ball fails to freely track across the mouse pad surface; and curser control, required for accurate location of the mouse pointer on the computer screen, is lost or diminished.

A significant reduction or increase in surface friction or texture of the mouse pad surface occurs sooner or later, depending mainly on the pad's surface construction and the usage to which it is subjected. Any bunching or horizontal shifting in plane of the mouse pad surface results in enhanced friction and poor rolling of the track ball. Decreased friction occasioned by contamination of the surface causes the track ball to slip rather than roll. Variations in the quality of the surface of the mouse pad change the friction characteristics of the track ball. Tracking ball movement is restricted, and tends to worsen over time, until the mouse becomes virtually useless in contact with the pad surface. Few problems are more maddening to the computer operator than the loss of curser control imposed by imperfect roller ball tracking. This importance of resolving this problem is demonstrated by the extensive varieties of commercial mouse pads touting diverse surface constructions said to provide restriction-free mouse tracking.

Mouse pad and note pad combinations are known in the art. U.S. Pat. Nos. 5,876,010 and 5,971,340 to Murphy disclose a combination mouse pad and writing pad in which a plurality of sheets of paper are secured together and further secured to a chip board base. Each sheet has a top surface textured by the presence of a plurality of micro scales thermo-graphically printed over substantially the entire top surface to define a working surface. U.S. Pat. No. 5,405,168 to Holt discloses a combination computer mouse pad and note pad that includes a plurality of sheets of paper, for providing a work surface upon which notes can be written and a computer mouse can be operated. The sheets are free to move laterally. As a consequence, the sheets tend to become deformed, since damage thereto by the trackball extends well beyond the top-most sheet. Furthermore, the indentations and contamination produced thereon by writing severely roughens the unsupported sheet surface of the mouse pad, compromising the mouse's tracking ability.

Canadian Patent CA2244950 to Lurani, et al. discloses a notebook or similar paper element that comprises a plurality of bound pages provided with a limited-friction surface. It comprises, among other components, an embossed plastic material and a second page comprising a layer in an expanded thermoplastic material.

With these devices, the writing tends to contaminate the mouse roller ball thereby inhibiting proper mouse tracking.

Canadian Patent CA2202007 to Hauptman discloses a computer mouse pad comprising a monolayer structure material of predetermined thickness having an upper surface of a smooth texture. The upper surface is also capable of absorbing unwanted residues deposited thereon during usage; as a result, preventing residues from being picked up by the roller ball. Eventually though, the surface of Houpman's mouse pad will wear or be contaminated, and will need to be replaced.

U.S. Pat. No. 3,925,584 to Suzuki et al. discloses an adhesive seal and tape for sealing. A laminated product is formed by the application of a strong adhesive to one side of a thin-leaf, extremely fragile material, which is thereafter bonded to a strong supporting sheet. This supported laminated structure prevents the breakage of the extremely fragile layer. Any displacement of the tape in a package by secret pilferage is indicated by the breakage of the extremely fragile layer of the laminate. The device of the Suzuki patent uses sheets permanently bonded with different strength characteristics. Due to the permanent nature of the adhesive bond, the sheet cannot be detached from the thin-leaf, fragile material. Consequently, no provision is made by the Suzuki et al. device for periodic refreshing of the sheet.

U.S. Pat. No. 4,350,545 to Garabedian discloses a method of laminating plastic sheets. It uses a plurality of plastic layers which are laminated under heat and pressure with at least all but one of the plastic layers being gas permeable, so that the gas trapped between the layers can be vented during the lamination process. These multiple layers are plastic sheets, which are permanently bonded together by the application of heat and pressure, and do not provide mouse pad functionality.

U.S. Pat. No. 4,975,735 to Bright et al. discloses a document carrier form for scanning and microfilming operations. It uses a pocketed document carrier, which has a transparent plastic film first part and a second part composed of white paper. The document in the pocket is fed through optical scanning equipment. The second part, comprising white paper, has an optimum paper weight of 70 pounds, although it is also contemplated that white bond paper having 20–24 pounds paper weight may be used (col. 3 lines 31–35). A document carrier having the Bright et al. construction contains no more than a single sheet, which is loosely disposed within a pocket without any bonding whatsoever.

U.S. Pat. No. 5,217,781 to Kulpers discloses a computer mouse pad composed of a polyvinyl chloride upper layer, an intermediate crease resistant plastic layer, and a bottom layer functioning as an anti-skid layer in contact with the ground or a working table. These layers are welded together along the periphery (col. 1 lines 53–61) or joined permanently together by gluing, sticking or luting. (col. 1 lines 59–60). Once joined, the plastic layers cannot be separated. No provision is made for removing the top layer to refresh the surface of the mouse pad.

UK patent application GB 2289520 to Higgs discloses a mouse pad in which a multitude of sheets are glued at the edges to create a mouse pad. Each sheet can be removed whenever necessary to expose a clean new sheet on the mouse pad. Since the glue is only present on the edges, each sheet is not completely supported, and the sheets migrate during use, causing them to become displaced from each other. Glue thickness tends to become overly cumulative on the edges. The edge portions become thicker than the center portion, preventing proper support within the central portion of the sheets—the very place wherein the mouse track ball rolls. In addition, the lack of support provided at the central portion of the sheets tends to cause deformation and crinkling of the paper.

UK patent application GB2307445 to Webb discloses a computer mouse mat comprising a notepad. The notepad is supported on a card back 5 with a stack of papers bonded together along adjacent edges. Bonding is restricted to the full length of the bottom edge 3 and left hand edge. The sheets are made with paperweight greater than 70 gsm (page 5 line 23) or made from non-absorbent films, which are non-wrinkling. Each sheet of papers is bonded along the edges by applying adhesive to the edge of the sheets. Alternatively the surface of each sheet is bonded to the adjacent sheet surface along the edges (page 2 lines 9–16). Inasmuch as the glue bonding the edges is placed between the sheets of the notepad, the thickness of the glue represents the separation between the sheets. Such separation produces a gap between the central portion of each sheet and the sheet immediately therebeneath. This gap results in poor sheet support, particularly within the central portion. Without proper sheet support, track ball movement is impaired and impressions from writing instruments damage or mar the surface of the sheet for sustaining track ball motion or impressions by a writing instrument. In such cases, the regions of the stacked sheets directly below the tracking ball are oftentimes displaced horizontally and bunch up, preventing accurate movement of the track ball. Moreover, Webb's use of the pad for writing roughens the unsupported sheets of the note pad surface, preventing smooth motion of the trackball.

At least one mouse pad on the market avoids mechanical surface tracking by a mouse roller ball. The pad is especially suited for use with an optical sensing element, and is characterized a smooth pad surface. For example, U.S. Pat. No. 4,834,502 to Bristol, et al., discloses a pad, adapted for use with an optical mouse. The pad includes a substantially transparent sheet having a pattern of spaced dots on one surface thereof.

There remains a need in the art for a computer mouse pad which can be used with a variety of mechanical mouse tracking devices, to accomplish roller ball tracking, curser location and mouse manipulation in an accurate, reliable manner over a prolonged period of time.

SUMMARY OF THE INVENTION

The present invention provides a computer mouse pad having an uppermost surface adapted to provide optimal roller ball tracking. A plurality of detachable mouse pad plies mounted on a base provide means for refreshing the mouse pad surface to maintain optimal tracking conditions. The individual sheets of paper are detachably attached to the adjoining sheet by adhesive glue, which covers a substantial portion of the surface to prevent horizontal displacement of the sheet during movement of the mouse track ball thereover. The mouse pad plies are removed successively before usage causes the uppermost surface to become so worn or degraded that roller ball tracking or surface appearance is adversely affected.

Each of the detachable plies is constructed of paper having an offset weight of approximately 70 pounds. In addition to its weight, the paper has adequate tensile strength to withstand deformation forces imposed by movement of the track ball roller, even when it is supported by adhesive covering substantially the entire undersurface of each layer, including the layer located immediately above a rigid base. The base of the ply comprises a paper composition similar to that conventionally used for most note-taking paper pads. For increased stability, the base is additionally provided with a non-skid under surface. Generally, the number of tracking surfaces exceeds several plies and ranges upward into the mid-teens. The maximum number of plies utilized depends on the strength and thickness of the sheets of paper, the thickness of the adhesive and the support structure provided by the combination of the paper sheets and the adhesive layer. The surface of each sheet that opposes the adhesive coated surface is provided with an adhesive release coating, which additionally functions to enhance the appearance of the surface. The adhesive release coating operates to decrease damage to the sheet brought about by swelling or buckling, which is oftentimes created by moisture absorption and other environmental conditions. The coating further operates to minimize the accumulation of dust, stains, carbon or graphite material, and the like. It enhances the overall ability of the upper surface to maintain proper tension, thereby facilitating roller ball tracking movement.

Each of the plies is, optionally, provided with printed material on its uppermost surface. Through an on-press or off-press application, each ply is further provided with a protective spray coating to enhance surface quality. This spray coated surface layer is transparent so that the printed material could be easily seen and also functions as a release layer and a moisture barrier. A pile binding is typically effected in the manner employed for note-taking pads. The binding can be applied on one or more sides of the pad.

Adhesion of the plies can be achieved by coating a substantial portion of the undersurface of each ply, to provide sufficient tackiness that the plies are stabilized against movement in virtually any direction without compromising removability. Advantageously, with this embodiment, stabilization is markedly improved without need for application of binding to one or more sides of the pad. Process costs associated with the binding step are decreased and replenishment of the upper sheet is facilitated.

In one embodiment, the entire undersurface of the sheet may be coated with the adhesive layer. In a second embodiment, the adhesive coating may be applied as a closely spaced series of circles or rectangles, so that the top layer is prevented from horizontal motion when the track ball is rolled. This spacing sensitively depends on (1) the tensile strength of the sheet of paper, which is controlled by the fiber length of the paper; (2) the bulk density of the paper (herein defined as the distance between the fibers and the resultant hydrogen bond); and (3) the thickness of the adhesive layer. Since the adhesive layer deforms freely under load, it is preferable to minimize the thickness of the adhesive layer as compared to the thickness of the paper. It is also desirable to use paper having higher tensile strength, so that they can withstand the forces applied by the track ball. The requirements described hereinabove are less critical when the underside of the paper sheets is completely covered by a thin adhesive layer. One or more adhesive areas, such as adhesive spots applied from the binding side of a pile, can be applied to the under surface of each ply to improve adhesion of the upper ply to the ply below it, and thereby stabilize the plies against transverse movement during use.

More specifically, the invention provides a computer mouse pad comprising a rigid base and a stack of sheets of paper detachably fixed to the base. Each sheet of the stack is detachably fixed to the sheet below it. The stacked sheets are provided with printed messages on upper surfaces thereof. An upper sheet is removed when worn or soiled, thereby exposing the next sheet in the stack and its message, for use as the upper surface of the mouse pad. The coated upper surface is resistant to being written upon except in specific locations, where the mouse track ball is not expected to contact, thereby preventing accumulation of carbon, graphite, ink, and the like, which tend to contaminate the roller ball, prevent proper mouse tracking and adversely affect curser control. This coating also acts as a moisture barrier, preventing the swelling of the top most paper sheet; and as a release layer to allow the sheet to be detached readily from the adjoining sheet.

Advantageously, the pile with detachable plies provides means for regenerating fresh usable surfaces, one surface at a time, as surfaces become degraded in appearance or mouse tracking capability. The pile also provides means for displaying printed information helpful to the computer user, such as application shortcuts, tips, and the like. Printed information additionally displayed by the pile can comprise decorative configurations, such as color pictures of flower bouquets, landscapes or patterns, calendar images and other presentations, including advertising. Detached plies can be displayed apart from the pad, scanned into memory or otherwise saved, or discarded, in accordance with user preferences. The mouse pad appearance can be refreshed by providing a newly exposed ply having the same presentation as the previous ply. Refreshing the ply appearance can be encouraged by displaying on successive pages a plurality of differing, self-contained printed images that provide continuity. An incentive for timely refreshment of the ply appearance can also be engendered by provision of a mouse pad in which the information conveyed by successive ply removal creates a serial affect.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Figure 1:
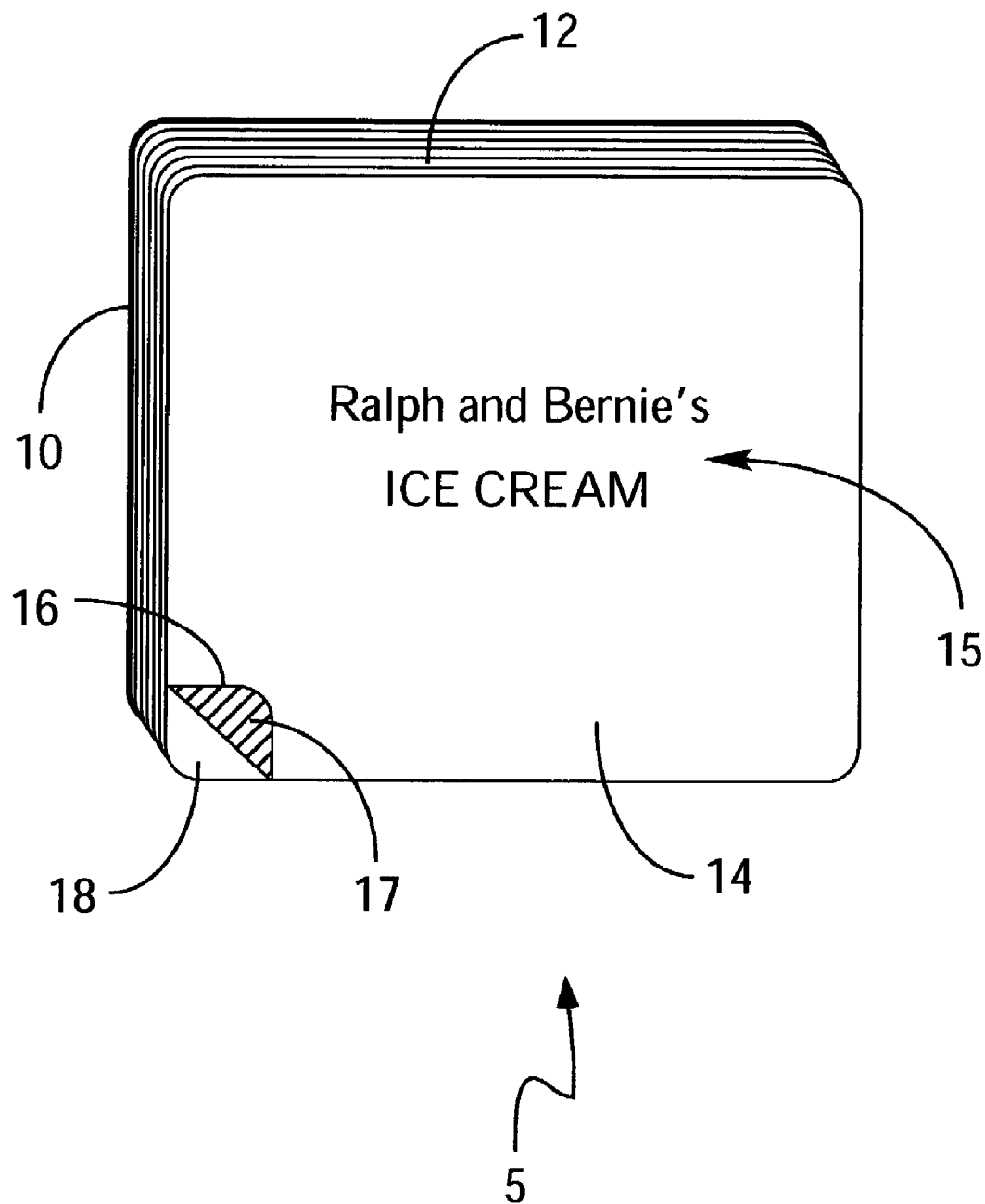
FIG. 1 is a perspective overhead view depicting the mouse pad of this invention.

The mouse pad of the present invention comprises a plurality of plies adapted to provide continually available surfaces. Advantageously, the uppermost surface of the mouse pad is refreshed periodically by successive removal of plies before the uppermost surface becomes unduly worn in texture or appearance. Trouble-free tracking of the mouse, and optimal curser control is obtained through utilization of detachable mouse pad plies mounted on a base.

Each detachable ply is preferably composed of paper having approximately 70 pound offset weight, with good tensile strength properties. The base is generally a composition paper similar to that used with most note-taking paper pads, and is preferably provided with a non-skid under surface. A plurality of plies, typically exceeding several and ranging upward to the mid-teens, provide means for refreshing the tracking surface periodically. The maximum number of plies employed during usage of the mouse pad can vary, depending on the ability of the upper surface to resist degradation caused by plowing. Such "plowing action" is produced during rolling of the track ball. It is influenced by the strength and thickness of the of the sheet of paper, the thickness and distribution of the underlying adhesive layer, scratches, stains, pencil and pen markings, and the like. In this manner there is maintained a tension and surface friction sufficient to facilitate tracking ball movement.

Each of the piles is printed on its uppermost surface, and through an on-press or off-press application receives, if desired by the pad designer and/or manufacturer, a protective spray coating to enhance surface quality. Pile binding is typically effected through binding similar to that used for note-taking pads, applied on one or more sides. In addition to the edge binding, adhesion of the plies can be achieved by providing sufficient tackiness on the ply undersurface. The tacky layer preferably covers a substantial portion of the underside of the paper sheet. It can also be provided in the form of patterned coverage applied to preselected areas, to thereby achieve adhesion without compromising removability. Adhesion of each upper ply to the ply immediately below it is improved by application of either substantial coverage of the underside of the paper sheet or patterned coverage comprising one or more adhesive spots applied to preselected areas of the upper ply's bottom side. Preferably the adhesive spots are applied in a direction extending across from the binding side of a sheet. The number of adhesive spots should be sufficient to provide coverage adequate to prevent horizontal motion of the top sheet of paper under forces applied by the mouse track ball.

Advantageously, the pile with detachable plies comprises a means for generating fresh usable surfaces, one surface at a time, as extant surfaces lose their efficacy. The pile also comprises a means for displaying printed information useful to the computer user. Such printed information can include application shortcuts, tips, and the like. It can also include decorative pages such as color pictures of flower bouquets, landscapes or patterns, calendar pages and other presentations, such as advertising. Detached plies can be displayed apart from the pad, scanned or otherwise saved into memory, or discarded, according to user preferences. Means are thereby provided for attaining a fresh mouse pad appearance. Successive pages displaying a plurality of differing, self-contained printed images that collectively provide presentation continuity can be used to encourage timely refreshment of the plies. The incentive for timely ply refreshment can also be engendered by provision of a mouse pad in which the information conveyed by successive ply removal creates a serial affect.

Referring to FIG. 1 of the drawings, there is shown generally at 5, the computer mouse pad of the invention. The mouse pad 5 comprises a base 10 having detachably fixed thereto a stack of paper sheets 12.

Figure 2:
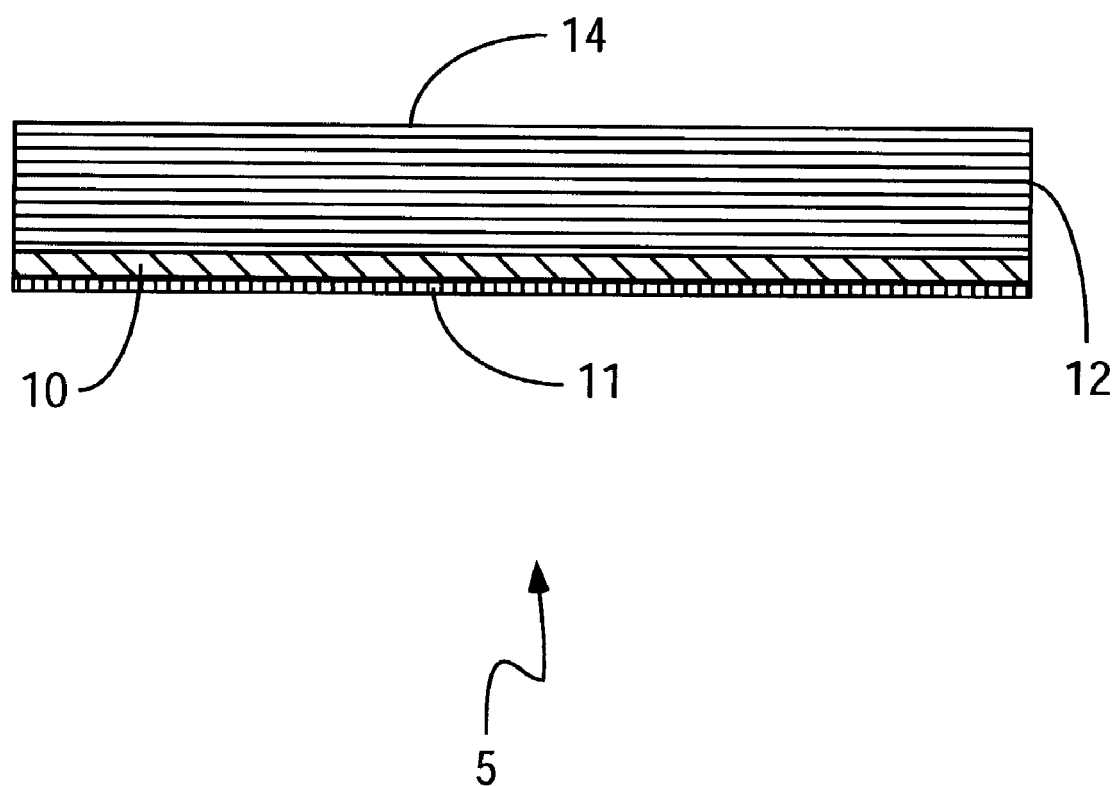
FIG. 2 is a side view of the mouse pad shown by FIG. 1.

In FIG. 2 there is shown a side view of a mouse pad 5, wherein stack 12 is detachably fixed to base 10. The lower side of base 10 is preferably provided with a non-skid surface 11. A mouse (not shown) is maneuvered on the upper surface of sheet 14. Preferably, base 10 is rigid enough for pad 5 to be held by a corner without substantial bending or deformation thereof; and it is comprised of cardboard at least 0.5 mm thick. Alternatively, the base 10 is comprised of plastic at least 0.25 mm thick. Each sheet in the stack 12 is detachably fixed to the sheet below it in the stack. It contains an adhesive distribution sufficient to prevent horizontal movement of the paper sheet under the applied loading of the mouse track ball. A printed message 15 (shown in FIG. 1) is disposed on the upper surfaces of the sheets. Preferably, printed message 15 is visible from the top of sheet 14. When upper sheet 14 becomes worn or soiled, it is removed by pulling up edge 16, as indicated in FIG. 1. Removal of sheet 14 exposes the next sheet 18 in stack 12, as well as the printed message thereon; and sheet 18 then functions as the new upper surface of mouse pad 5. Pulled-up edge 16 reveals next sheet 18, as well as adhesive 17 that detachably fixes top sheet 14 to next sheet 18.

Typical adhesive layers employed for coating the underside of the sheets in the computer mouse pad include rubbery materials, which form a pressure sensitive adhesive layer wherein block copolymers together with plasticizers are used. The block polymers such as high-cis polyisoprene compositions in the unvulcanized green state are applied and cross linked to form a tacky coating. High strength adhesives, films and coatings wherein 5–30 weight percent of block copolmer of the type A-B-A to 100 parts by weight of conventionally tacky viscoelastic pressure sensitive adhesive can be used to produce a higher strength adhesive. The high strength properties are obtained by blending minor amounts of certain block copolymers, which can be elastomeric, with the adhesive solids. In the resulting reinforced pressure-sensitive adhesive solids, the major elastomeric component comprises one of the homopolymers or random sequence polymers commonly used in tackified or inherently tacky pressure-sensitive adhesives, e.g. natural rubber, synthetic polyisoprene, styrene-butadiene rubber (SBR), rubbery polyolefins, and the inherently rubbery and tacky acrylate and vinyl ether polymers. The aforementioned block copolymer, though a minor component compared to the rubbery homopolymer or random sequence polymer, has a significant reinforcing effect. The increase in film integrity or physical strength of the adhesive obtained is evidenced by increased tensile strength and is similar to that obtained by the use of fibrous reinforcement, while at the same time avoiding the above-noted disadvantages caused by fiber addition. These block copolymers blend with the pressure-sensitive adhesive (hereinafter referred to as the "PSA") providing homogeneous reinforcement. The use of a high strength adhesive layer allows use of thin adhesive layers in the thickness range of 10 to 50 micrometers with excellent adhesive and support properties without crinkling or deformation of the sheets in the mouse pad when the mouse track ball is rolled.

Figure 3:
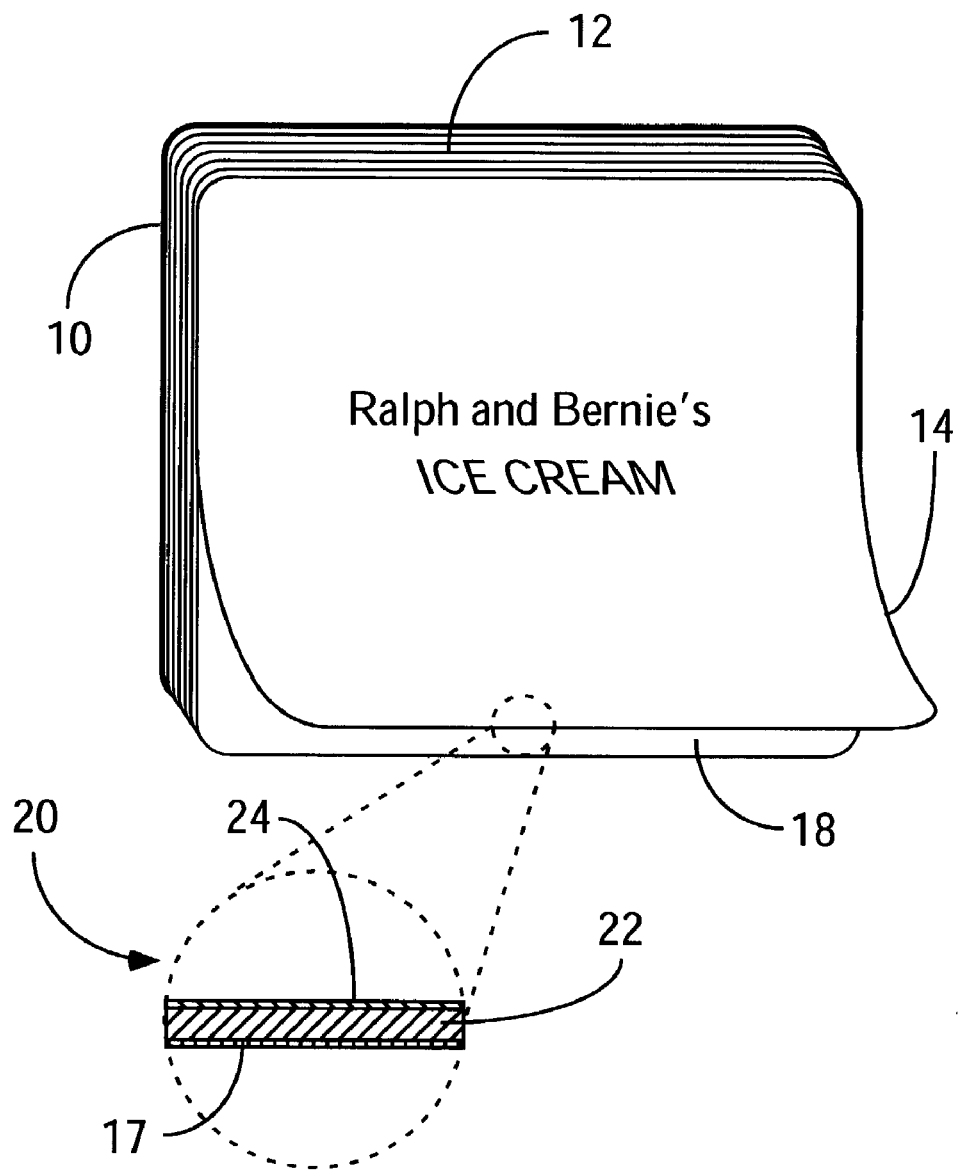
FIG. 3 is a blow-up of one edge of a sheet of the mouse pad shown in FIG. 1.

Referring to FIG. 3 of the drawings, there is shown generally at 20 a magnified view of the edge of top sheet 14 in stack 12. Each of the stacked sheets is comprised of paper 22 having an upper surface laminated or coated with a thin smooth film 24, such as PVC or cellophane. This coating resists moisture penetration into the paper, which can degrade paper strength and cause it to swell, compromising the hydrogen bond. In addition, the coating functions as a release layer to facilitate separation of the adhesive layer. All sheets within stack 12 are similarly constructed. Film 24 is resistant to being written upon or soiled. This coating extends strictly to areas of the sheet where the mouse would normally be expected to move, leaving the remaining portions of the pad available for note taking and message writing. The smoothness of film 24 significantly reduces friction between the mouse pad surface. Most writing instruments such as pencils or pens of the fountain or roller ball variety do not function properly on the film 24. As a result, use of the mouse tracking surface for note taking is discouraged. In addition, film 24 functions as a release agent for the adhesive layer. A friction reduction adequate for this purpose is accomplished without affecting the friction between the mouse pad surface and the rubber mouse roller ball. As such, the upper surface provides for an enhanced contact with the mouse roller ball that engages it. Unrestricted roller ball tracking and improved curser control is afforded. The resistance to pencil and pen marks significantly reduces the amount of contaminants such as carbon, graphite, ink or the like on the upper surface of the mouse pad. In addition, the smooth coated surface affords increased resistance to soil and stains. Such contaminants, when present, tend to interfere with movement of the mouse roller ball, disrupting mouse tracking, with the result that cursor control is severely diminished. Preferably, film 24 is formed from a composition conventionally referred to by the printing industry as an aqueous solution. The aqueous solution is applied on-press to brighten the paper sheets of which the pile is comprised. It significantly improves the soil and wear resistance of the upper surface of sheet 14. Film 24 is also resistant to writing. Typically, the coating solution is drawn from a fountain onto a metal roller and then transferred to a rubber blanket. It is then brought into contact with the paper sheet or web traveling through the press. The coating dries by the time it reaches the stacker end of the press, forming film 24.

The top surfaces of the sheets in the mouse pad are coated with a release layer, which allows easy separation of the adjacent sheet coated with the adhesive. The coating is generally transparent allowing the printed material on the sheets to be seen clearly. A release coating of fluorochemical variety can be made from essentially of a polymer of moieties consisting essentially of (a) perfluoroalkylsulfonamido lower alkyl acrylate in which the alkyl portion of the perfluoroalkylsulfonamido moiety contains 3–20, preferably 3–12, carbon atoms, (b) a perfluoroalkylsulfonamidoalkanol: toluene diisocyanate:hydroxypropylmethacrylate reaction product in which the alkylidene radical contains 1–11 carbon atoms and (c) 0–10% by weight, based on total polymer, of lower alkyl acrylate. The use silicones as release agents, including siloxane starting materials, accelerators, cross linking agents, curing catalysts, and coating techniques are well-known. For example a release agent can be formed by the reaction of an isocyanate-terminated moiety and a liquid hydroxyl- or amine-containing organosilicone. This release agent, however, is effective with only a few specific adhesives. For computer mouse pad application it is desirable to use fluorochemical or silicone release coatings, since both coatings are transparent, provide easy release of adhesive coatings employed and discourages writing since graphite from a pencil or ink from a pen are not deposited on the sheet of paper.

In an alternative embodiment, a varnish is used as film 24 to render the upper surface of sheet 14 resistant to stains, wear and marking with carbon, graphite and ink. As a further alternative, film 24 is comprised of PVC or cellophane. With this construction of the mouse pad, the upper surface of sheet 14 is rendered virtually immune to wet ink contamination. The surface energy provided by the PVC or cellophane film 24 causes the ink to bead, enhancing resistance against adherence thereof to the upper surface of sheet 14. As yet another alternative, film 24 comprises a heat-set ink which through the application of heat almost instantly dries and hardens, imparting wear and writing resistant properties to the upper surface of sheet 14.

As best shown in FIG. 3, the lower surface of paper 22 is coated with adhesive 17. The coated adhesive 17 is tacky enough to hold stack 12 together; yet still be able to separately remove each sheet of paper. Such adhesives are well know by those skilled in the art.

Paper 22 must be of adequate weight and strength to withstand the stress of track ball use and removal from the pad. Very heavy paper, having offset weight greater than 95 pounds, will result in unnecessarily thick sheets without adding substantially to the robustness of a sheet. Preferably, the offset weight of the paper sheets is between 20 and 90 pounds. More preferably, the offset weight ranges from about 45 to 85 pounds. Most preferred is paper having offset weight substantially equal to about 70 pounds.

The adhesive layer should be as thin as possible, covering substantially the entire underside of the sheet. The thickness of the adhesive layer may range from 10 micrometers to 50 micrometers. Instead of being a continuous layer, the adhesive layer may be applied as a series of closely spaced circular dots or rectangular shapes that collectively cover from 50 to 95 percent of the sheet area. The distribution of the patterns and the unbonded distance between bonded regions depend on the strength and thickness or weight of the paper. Thicker and stronger papers permit larger unbonded distances with very little or no horizontal displacement of the sheet under the track ball loading.

Message 15 on the sheet is an advertisement, logo, computer usage hint, cartoon, or the like. All the sheets have the same or, alternatively, different messages. The messages are preferably printed on the upper surface of each paper sheet prior to application of the laminated or coated film to the paper surface. Alternatively, when film 24 comprises a transparent material, message 15 may be printed on the lower surface of the film 24.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A computer mouse pad having a top surface that facilitates continual tracking of a mouse having a roller ball, comprising;

a. a rigid base;
   b. a stack of paper sheets detachably fixed to each other and to said base and comprising an uppermost sheet with an upper surface having an area that forms said top surface of said mouse pad;
   c. each sheet of paper in said stack being detachably fixed to a sheet immediately below it in said stack by an adhesive layer, and having a printed message on its upper surface, wherein said adhesive layer covers 100% of the underside of said sheet of paper; and
   d. substantially the entire surface of said upper surface being coated with a moisture resistant adhesive release layer consisting of varnish, said coating being applied so that it completely covers said printed message and protects said messages from material degradation which is threatened during said continual tracking of said mouse across said upper surface, said coating being transparent to allow a clear view of said messages, being resistant to disintegration during said continual tracking of said mouse, and being adapted to resist formation thereon of markings composed of material selected from the group consisting of lead, graphite and ink, whereby said uppermost sheet is removed when worn thereby exposing the sheet immediately below it in said stack and its message for use as the upper surface of said mouse pad.

2. The computer mouse pad as recited by claim 1, wherein each of said sheets of paper has an offset weight ranging from about 20 to 90 pounds.

3. The computer mouse pad as recited by claim 1, wherein each of said sheets of paper has an offset weight substantially equal to about 70 pounds.

4. The computer mouse pad as recited by claim 1, wherein each of said sheets of paper has an offset weight of at least about 70 pounds.

5. The computer mouse pad as recited by claim 1, wherein said base is comprised of cardboard having a thickness of at least about 0.5 mm.

6. The computer mouse pad as recited by claim 1, wherein said adhesive layer is 10 to 50 micrometers in thickness.

7. The computer mouse pad as recited by claim 1, wherein said base is comprised of plastic having a thickness of at least about 0.25 mm.

8. The computer mouse pad as recited by claim 1, wherein said base comprises a non-skid lower surface.

\* \* \* \* \*